June 5, 1956 J. B. DYER ET AL 2,748,612
WINDSHIELD WIPER ACTUATING MECHANISM
Filed Feb. 19, 1953 2 Sheets-Sheet 2

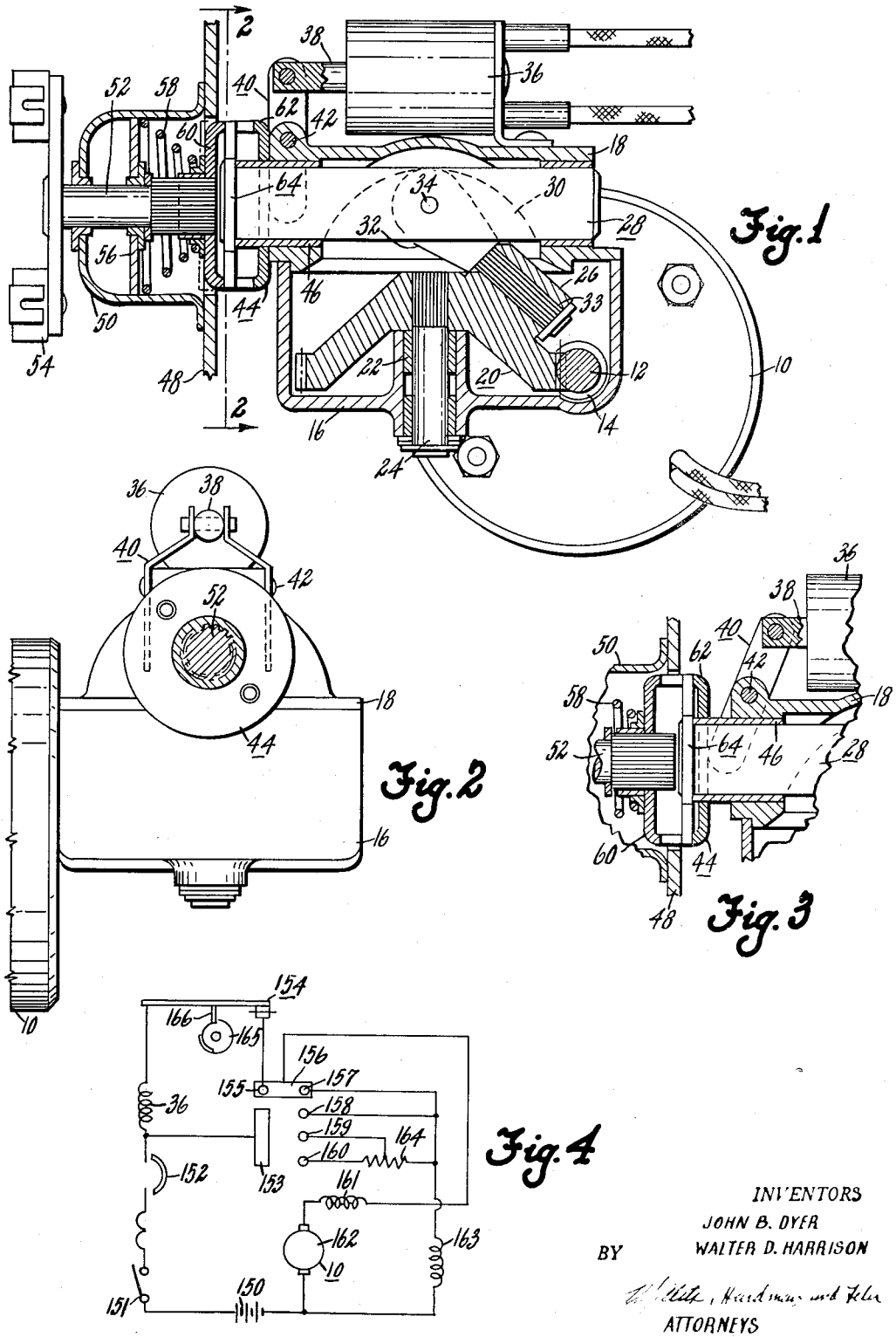

INVENTORS
JOHN B. DYER
WALTER D. HARRISON
BY
ATTORNEYS

United States Patent Office 2,748,612
Patented June 5, 1956

2,748,612

WINDSHIELD WIPER ACTUATING MECHANISM

John B. Dyer, Syracuse, and Walter D. Harrison, Rochester, N. Y., assignors to General Motors Corporation, Detroit, Mich., a corporation of Delaware Application February 19, 1953, Serial No. 337,862

17 Claims. (Cl. 74—70)

This invention pertains to winshield wiper actuating mechanisms, and more particularly to a coupling adapted for use in wiper actuating mechanisms.

One of the recurring problems which manifests itself in the design of electric motor driven wiper actuating mechanisms, is that of providing means for effecting movement of the blades out of the normal wiping range and into a parking position remote from the vehicle operator's line of vision. This problem arises from the fact that mechanisms for converting rotary movement into oscillatory movement, though exceedingly simple in design and economical to manufacture when a fixed arc of oscillatory movement is required, become rather complicated and expensive when modified to include means for varying the arc of oscillatory movement. This invention proposes a more realistic solution in that a coupling is employed to vary the arc of oscillation of an output member, the coupling being driven by an input member having a fixed arc of oscillation. Accordingly, among our objects are the provision of a coupling including means whereby the arc of oscillation of the driven member thereof may be varied with a fixed oscillation arc of the driving member thereof, and the further provision of wiper actuating mechanism including a coupling of the aforesaid character.

The aforementioned and other objects are accomplished in the present invention by employing a unique mechanism for converting rotary movement of a motor driven member into oscillatory movement of a shaft, the shaft having a predetermined and invariable oscillatory arc of movement. The shaft is operatively connected to the driving member of a coupling, the coupling being so constructed and arranged that the driving member has a plurality of driving connections with the driven coupling member. Specifically, the wiper actuating mechanism includes a nylon worm gear driven by a unidirectional electric motor. The shaft to be oscillated is rotatably supported at right angles to the axis of the worm gear, the shaft having a medial slotted portion within which one end of an arm is retained by means of a cross pin. The other end of the arm, or connecting member, is rotatably journaled in the worm gear, the axis of rotation of the connecting member being disposed at substantially 45° to the axis of rotation of the worm gear. With this construction it is apparent that upon rotation of the worm gear, rotation will be imparted to the connecting member, which, in turn, will impart an oscillatory motion to the actuating shaft.

The coupling includes three component parts, namely: a dog member, and a pair of cup-shaped members having coengaging slotted peripheral surfaces. The dog is rigidly attached to and driven by the oscillatable actuating shaft, while the cup-shaped members are assembled to form the driven member. As the dog is rigidly connected to the actuating shaft, it will have a predetermined, fixed arc of oscillation. Moreover, the only driving connection between the driven coupling member and the actuating shaft is through the dog. The peripheral surface of one of the cup-shaped members is formed with diametrically opposed slots within which the ends of the dog fit rather closely. The peripheral surface of the other cup-shaped member likewise has diametrically opposed slots of substantially greater widths than the dog engaging slots in the first cup-shaped member, one end of the slots being offset a predetermined amount from the ends of the diametrically opposed slots in the first cup-shaped member. The angular relationship between the ends of the slots and the members is such as to enable a variable arc of oscillation of the driven coupling member with an invariable arc of oscillation of the driving member. The coupling produces an output movement similar to that disclosed in our copending application, Serial No. 320,774, filed November 15, 1952.

When the coupling is employed in conjunction with windshield wiper actuating mechanism, the driven coupling member is operatively connected to transmission means for actuating a pair of displaced wiper blades in unison. In addition, means are provided for effecting relative movement between the driving and driven coupling members to enable variation of the arc of oscillation of the driven coupling member, which means comprise resilient mechanism for normally maintaining the dog within the confining slots of one of the cup-shaped members such that the driven coupling member has imparted thereto an oscillatory motion throughout the same arc as that of the actuating shaft. When the vehicle operator desires to disrupt operation of the wiper, by operating a switch, a solenoid is energized, the armature of which effects movement of the cup-shaped coupling members relative to the dog whereby the wiper blades are moved out of the normal range of vision. When the blades have been driven by the electric motor to a parking position, automatic switch means are actuated to deenergize the motor and the solenoid whereupon the blades will remain in the parked position.

Further objects and advantages of the present invention will be apparent from the following description, reference being had to the accompanying drawings wherein a preferred embodiment of the present invention is clearly shown.

In the drawings:

Fig. 1 is a view partly in section and partly in elevation showing actuating mechanism constructed according to this invention;

Fig. 2 is a sectional view taken along line 2—2 of Fig. 1;

Fig. 3 is a fragmentary sectional view illustrating the position of the coupling when the solenoid of Fig. 1 is energized;

Fig. 4 is a schematic diagram of the electrical energizing circuit for the wiper motor;

Figure 7:
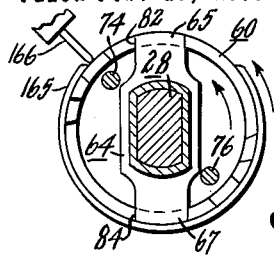
Figs. 7 through 10 are views partly in section and partly in elevation, showing the relative positions of the component coupling parts in various stages of operation.

With particular reference to Fig. 1, the wiper actuating mechanism includes a unidirectional motor 10 having a shaft 12 driven thereby and having a portion thereof formed as a worm 14. The worm 14 is disposed in a housing having two parts 16 and 18. A worm gear 20, composed of a synthetic linear polyamide, such as nylon, is rotatably supported by a shaft 24 on bearing means 22 disposed within portion 16 of the housing. As it is apparent from an inspection of Fig. 1, the worm gear 20 has formed substantially a truncated cone having a projecting portion 26. An actuating shaft 28 is suitably supported for rotation within portion 18 of the housing, the axis of shaft 28 being disposed at substantially right angles to the axis of shaft 24. The shaft 28 has a slotted portion 30 within which the flattened end of an arm 32 is retained by means of a cross pin 34. The arm 32 constitutes the connecting member between the rotatable worm gear 20 and the oscillatable shaft 28. The other end of arm 32 is journaled in an opening 33 within the projection 26 of the nylon worm gear, the axis of rotation of the arm 32 being disposed at substantially 45° to the axis of rotation of shaft 24. Moreover, the center of the cross pin 34 lies in a plane substantially coincident with that of the axis of shaft 24.

It is apparent that upon rotation of shaft 12, rotation will be imparted to the worm gear 20 by reason of the worm 14, which will in turn, rotate the arm or connecting member 32. As the bearing supported end of the arm 32 rotates, the end of the arm connected to the shaft 28 will impart an oscillatory movement to the shaft. With the construction and arrangement disclosed, rotation of the worm gear 20 will impart an oscillatory movement to the shaft 28 of substantially 90°. In addition to the arm 32 rotating with the worm gear 20 about the axis of shaft 24, the arm will rotate about its bearing support in projection 26 due to its pin connection with the actuating shaft 28.

A solenoid 36 is rigidly attached to portion 18 of the housing. The solenoid includes a winding disposed within a casing and a movable armature 38 having pivotal connection with a yoke 40. An intermediate portion of the yoke 40 is pivotally supported by a cross pin 42 in portion 18 of the housing, while the free ends of the yoke arms are disposed in contiguous relation to a coupling 44. The coupling will be described hereinafter in detail, but for the present, suffice it to say that the coupling 44 is supported for axial movement on bearing means 46 upon energization of the solenoid 36.

The coupling is adapted to be inserted through an opening in a vehicle firewall 48, which has rigidly attached thereto a cup-shaped member 50. Disposed within the cup-shaped member 50 and supported for oscillation therein is a shaft 52. One end of shaft 52 is splinedly connected to the coupling 44 and the other end of shaft 52 projects through the bottom of cup-shaped member 50 and is rigidly connected to a member 54 to which the ends of a flexible cable may be secured. The present invention contemplates the usage of a flexible cable transmission between the member 54 and the wiper shafts mounted in the vehicle cowl portion, not shown, in a conventional manner. However, the employment of a flexible cable transmission is only exemplary, as it is apparent the wiper actuating mechanism may be employed with other types of transmissions, such as links.

A collar 56 is rigidly retained within the cup-shaped member 50, the collar forming a seat for one end of a spring 58. The other end of spring 58 is adapted to engage the coupling 44, the spring 58 normally maintaining the coupling 44 in the position shown in Fig. 1. Upon energization of the solenoid 36, the yoke 40 will move the coupling axially along bearing surface 46 to the position shown in Fig. 3. The straight spline connection between shaft 52 and the coupling 44 permits relative axial movement therebetween but precludes relative rotary movement therebetween.

Figure 10:
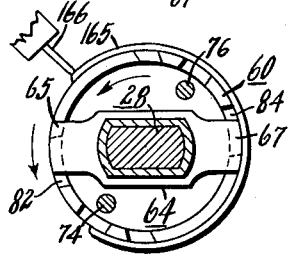
Figure 11:
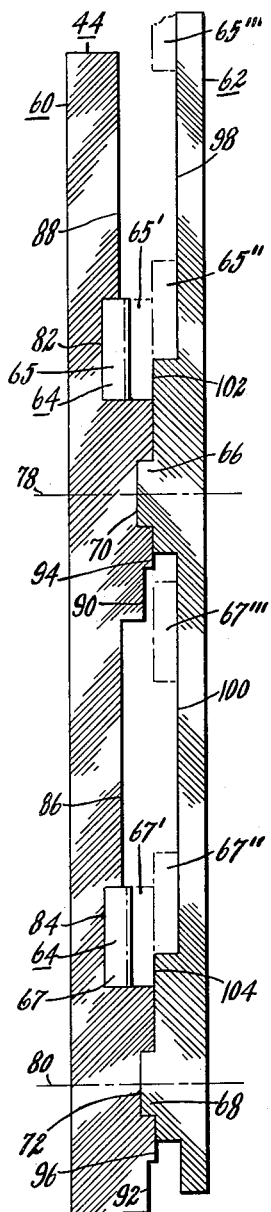
Fig. 11 is an enlarged development of the peripheral surfaces of the cup-shaped coupling members.

With particular reference to Figs. 5 through 11, the coupling 44 will next be described in detail. The coupling 44 includes cup-shaped members 60 and 62 having slotted edge surface, the developments of which are shown in Fig. 11, and a dog 64. As the dog is rigidly connected to the shaft 28, it will have imparted thereto an oscillatory movement of substantially 90°. The cup-shaped members 60 and 62 are provided with interlocking teeth and slots 66, 68, 70 and 72, and are retained in assembled position by a pair of rivets 74 and 76, with the dog 64 disposed in the diametrically opposed slots formed between the coengaging surfaces thereof.

With particular reference to Fig. 11, the center lines of the rivets 74 and 76 are indicated by lines 78 and 80, the distance therebetween representing 190°. It may be seen from Fig. 11 that the member 60 has a pair of diametrically opposed slots 82 and 84 of a width substantially equal to the width of ends 65 and 67 of the dog 64. Thus, when the ends 65 and 67 of the dog are disposed in slots 82 and 84 of member 60, the cup-shaped coupling members will have imparted thereto an oscillation equal to that of the dog, as is shown in the solid line position of the dog in Fig. 11. Coupling member 60 is also formed with diametrically opposed stepped portions 86 and 88, 90 and 92, and 94 and 96. The member 62 is formed with diametrically opposed slotted portions 98 and 100 having an angular extent of substantially 120°.

With particular reference to Figs. 7 through 10, the operation of the coupling 44 in varying the range of oscillation of the shaft 52 will next be described. In Fig. 7, the dog 64 is represented with ends 65 and 67 disposed within the confines of slots 82 and 84 of the cup-shaped member 60 while in Fig. 8, the dog is axially displaced therefrom. Accordingly, upon oscillation of the dog 64 by the shaft 28 throughout 90°, the driven member of the coupling constituted by the cup-shaped members will likewise be oscillated throughout an arc of 90°. If the solenoid 36 of Fig. 1 is now energized, relative axial movement will ensue between the cup-shaped members 60 and 62, and the dog 64 and the ends 65 and 67 of the dog will be moved to the phantom position indicated by 65' and 67' of Fig. 11. Movement of the dog ends into slots 98 and 100 is prevented by the diametrically opposed offset ends 102 and 104. However, the diametrically opposed stepped portions 86 and 88 of member 60 permit movement of the dog 64 relative to the cup-shaped members 60 and 62 until the ends of the dog 64, indicated by 65 and 67, reach the position illustrated in phantom 65" and 67" in Fig. 11, whereupon they will engage the bottom of slots 98 and 100, respectively.

Figure 8:
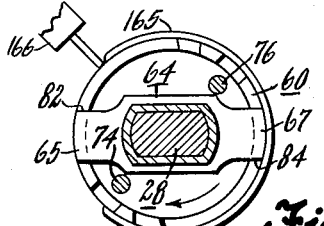
Figure 5:
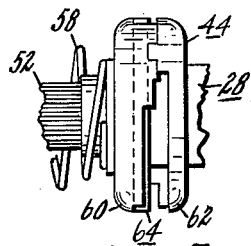
Fig. 5 is a fragmentary view in elevation of the assembled coupling.
Figure 9:
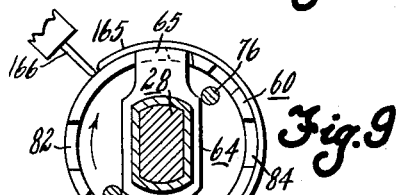
Figure 6:
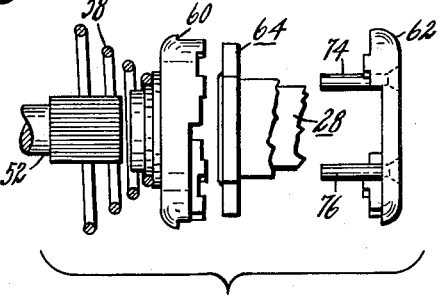
Fig. 6 is a fragmentary exploded view of the coupling.

When the ends 65 and 67 of the dog 64 engage the confining walls of slots 98 and 100, lost motion occurs between the dog and the cup-shaped coupling members. The 90° clockwise rotation of the dog 64, as illustrated by the arrow in Fig. 9, will move the ends 65 and 67 thereof to the positions illustrated by phantom lines 65''' and 67''', illustrated in Fig. 11. Upon the 90° counterclockwise rotation of the dog 64 due to the diametrically opposed offset portions 102 and 104, the cup-shaped members 60 and 62 will be moved throughout the arcuate distance of substantially 12°, which movement being at one end of the normal wiping stroke of the blades will result in positioning the blades out of the normal range of vision and into a parked position. In Figs. 7 through 10, the arrows within the confines of coupling member 60 indicate movement of the dog 64, while the arrows without the confines of member 60 indicate movement of said member. It will be noted from an inspection of Fig. 10 that the center lines of rivets 74 and 76 are displaced substantially 12° from the position they are shown in Fig. 8.

When the wiper blades have reached the parked position, as illustrated by the position of the member 60 in Fig. 10, automatic switch means, to be described, are actuated to deenergize the motor. However, as the dog 64 now can oscillate free of the cup-shaped members, a manually actuated switch will suffice to simultaneously deenergize the motor 10 and solenoid 36. When it is desired to initiate operation of wiper blades, the operator closes a switch, to be described, resulting in energization of the motor 10 and oscillatory movement of the dog 64, as previously described. If the ends of the dog are in the positions indicated by phantom lines 65" and 67" of Fig. 11, counterclockwise movement of the dog 64 will not move the coupling members 60 and 62, but upon counterclockwise movement of the dog 64, the spring 58 will urge the members 60 and 62 axially relative to the dog whereupon the ends 65 and 67 of the dog will again be positioned within the confines of slots 82 and 84.

With particular reference to Fig. 4 and Figs. 7 through 10, one form of electrical circuit will next be described. The circuit includes a battery 150, one terminal of which is connected through an ignition switch 151 and a thermal overload switch 152 to a switch contact 153. The switch contact 153 is also connected through the winding of solenoid 36 and an automatic switch 154 to a contact 155. A manual control switch is provided including a bridging contact member 156, the contacts 153 and 155, and contacts 157, 158, 159 and 160. The bridging member 156 is connected by a wire through the series field coil 161 of the motor to the armature 162 thereof. The other side of the armature 162 is connected to the second terminal of the battery 150. Contacts 157 and 158 are connected by wires through the series field 163 of the motor; contact 159 is connected to the field 163 through a portion of a resistor 164; and contact 160 is connected to the field winding 163 through resistor 164 in its entirety. The other end of the field winding 163 is, in turn, connected to a terminal of the battery 150.

As it is seen from a reference to Fig. 4, the automatic switch 154 is operated by a cam 165, which is engaged by a follower 166 suitably attached to the movable resilient blade of the automatic switch. Referring next to Figs. 7 through 10, the cam profile may conveniently be arranged on member 60 of the coupling 44. It is seen that the cam 165 includes a rise subtending an angle of substantially 270° of the circumference of the member 60, and a dwell subtending substantially an angle of 90°. Moreover, the cam follower 166 is so disposed in relation to the coupling 44, that it engages the dwell of the cam surface 165 throughout an arc of 90°, which, as hereinbefore stated, represents the normal oscillatory range of the coupling member when the blades, not shown, are being driven. The limits of the wiping stroke of the coupling 44 are illustrated by the positions of the cam rise in Figs. 7 and 8, respectively. When the contact member 156 connects contacts 153 and 158, the motor 10 is enrgized for slow speed operation; when the member connects contacts 153 and 159, the motor tends to energize for intermediate speed operation; and when the contact member 156 connects contacts 153 and 160, the motor 10 is energized for high speed operation. In either of the three-speed positions of the running motor circuit, the motion converting mechanism, heretofore described, converts rotary motion of the worm gear to oscillatory motion of the shaft 28 throughout an oscillatory arc of 90°. However, when the contact member 156 connects contacts 155 and 157, the solenoid 36 becomes energized, which results in the cup-shaped members of the coupling 44 being moved axially to the left from the position depicted in Fig. 1 to the position depicted in Fig. 3, which, as heretofore described, effects variation in the effective amplitude of the oscillatory movement of the output shaft 52, so that the wiper blades, not shown, are moved out of the normal range of position and to a parked position. When this occurs the coupling member 60 moves an additional 10 to 12° in a counterclockwise direction to the position it is shown in Fig. 10, whereupon the cam follower 166 traverses the incline between the cam dwell and cam rise such that the automatic switch 154 will be opened, thereby deenergizing the motor 10 and the solenoid 36.

Figure 12:
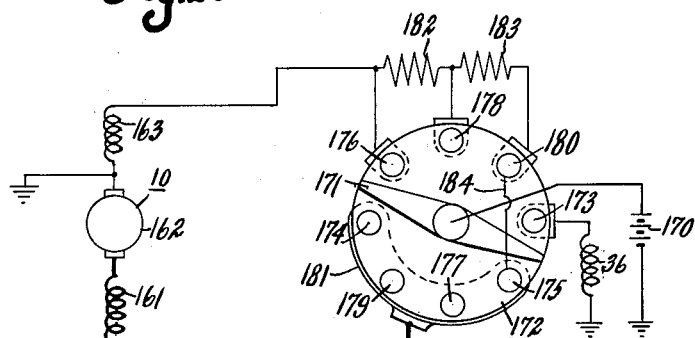
Fig. 12 is a modified circuit arrangement.

A modified circuit arrangement is illustrated in Fig. 12, which eliminates the necessity of an automatic parking switch. In this regard one terminal of a battery 170 is grounded and other terminal is connected to a bridging contact member 171 of a rotary switch 172. The rotary switch 172 includes four sets of diametrically opposed contacts which are numbered in a clockwise direction 173, 174; 175, 176; 177, 178; and 179, 180. Contacts 175, 177, 179 and 174 are interconnected by an arcuate bus bar 181, the bus bar being connected by a wire through the series field coil 161 of the motor to one side of the armature 162. The other terminal of the armature 162 is grounded, as is one terminal of the shunt field coil 163. The other terminal of the shunt field coil is connected by a wire to switch contact 176. Switch contact 176 is, in turn, connected to switch contact 178 through a resistor 182 and switch contacts 178 and 180 are connected through a second resistor 183. Switch contact 173 is connected to the solenoid winding 36 to ground. Contacts 175 and 180 of the switch are interconnected by a wire 184.

The operation of the circuit arrangement shown in Fig. 12 is as follows: When the bridging contact member 171 is in the position shown in Fig. 12, the motor 10 is deenergized. If the bridging member is moved in a clockwise direction such that contacts 175 and 176 are energized thereby, the motor 10 will be energized for low speed operation; when the bridging member 171 interconnects contacts 177 and 178, the motor 10 is energized for immediate speed operation; and when the contact member 171 is moved so as to interconnect contacts 179 and 180, the motor is energized for high-speed operation. When the operator desires to stop wiper movement and park the blades, not shown, the member 171 is moved in a counterclockwise direction, as viewed in Fig. 12, to a position where the bridging member 171 interconnects contacts 173 and 174, thereby energizing the solenoid 36 for effecting axial movement of the cupshaped coupling members 60 and 62 from the position they are shown in Fig. 1 to the position they are shown in Fig. 2. At this time, the series field is energized from the battery 170 through the bridging member 171, contact 174 and bus bar 181, while the shunt field of the motor is energized from the battery through a circuit including the bridging member 171, contact 174, bus bar 181, wire 184, contact 180, and the resistors 182 and 183. After the blades have been moved to the parked position, continued rotation of the motor 10 with the solenoid 36 energized, will not alter the position of the wiper blades. This result follows of necessity from the fact that with the solenoid energized, the dog 64 is free to oscillate relative to the cupshaped coupling members in the slot 100 throughout an angle of 90°. The motor can now be deenergized by moving the bridging member 171 to the position shown in Fig. 12.

While the embodiment of the present invention as herein disclosed, constitutes a preferred form, it is to be understood that other forms might be adopted.

What is claimed is as follows:

1. Windshield wiper actuating mechanism including in combination, a rotatable driving member, a driven member, means interconnecting said driving and driven members constructed and arranged to impart oscillation to said driven member upon rotation of said driving member, an oscillatable driven element, and means interconnecting the oscillatable driven member and the oscillatable driven element constructed and arranged to effect variation in the amplitude of the oscillatory movement of said driven element.

2. Windshield wiper actuating mechanism including in combination, a rotatable driving member, a driven member having an axis disposed at substantially right angles to the axis of said driving member, means interconnecting said driving and driven members such that rotation of the driving member imparts an oscillatory movement to said driven member, an oscillatable driven element, and means interconnecting the oscillatable driven member and the oscillatable driven element constructed and arranged to vary the amplitude of the oscillatory movement of said oscillatable driven element.

3. In combination with windshield wiper actuating mechanism, a coupling including, driving and driven members, one member having a radially extending projection, and the other member having a pair of receptive slots therein, means to impart oscillatory movement of fixed amplitude to said driving member, the construction and arrangement being such that the amplitude of oscillatory movement of the driven member is variable dependent upon which of the slots in said other member is engaged by the projection of said one member.

4. In combination with windshield wiper actuating mechanism, a coupling including, driving and driven members, one member having a radially extending projection, and the other member having a pair of radially misaligned receptive slots, means to impart oscillatory movement of fixed amplitude to said driving member, the construction and arrangement being such that the amplitude of oscillatory movement of the driven member is variable dependent upon which of the slots in said other member is engaged by the projection of said one member.

5. In combination with windshield wiper actuating mechanism, a coupling including, driving and driven members, one member having a radially extending projection, and the other member having a pair of radially misaligned receptive slots subtending unequal angles, means to impart oscillatory movement of fixed amplitude to said driving member, the construction and arrangement being such that the amplitude of oscillatory movement of the driven member is variable dependent upon which of the slots in said other member is engaged by the projection of said one member.

6. In combination with windshield wiper actuating mechanism, a coupling including, driving and driven members, one member having a radially extending projection, and the other member having a pair of axially spaced receptive slots therein, means operatively connected to said driving member to impart an oscillatory movement of fixed amplitude thereto, means operatively associated with said slotted member for moving the same axially such that the projection of said one member may be received by either of said axially spaced slots, the construction and arrangement being such that the amplitude of the oscillatory movement of said driven member is variable dependent upon which of the slots in said other member is engaged by the projection of said one member.

7. Windshield wiper actuating mechanism including in combination, a rotatable driving member, a driven member, means interconnecting said driving and driven members constructed and arranged to impart oscillatory movement to said driven member upon rotation of said driving member, an oscillatable driven element, and means including a coupling interconnecting the oscillatable driven member and the oscillatable driven element constructed and arranged to vary the amplitude of oscillatory movement of the driven element with a fixed amplitude of oscillatory movement of the driven member.

8. Windshield wiper actuating mechanism including in combination, a rotatable driving member, an electric motor operatively connected to said driving member for effecting rotation thereof, a driven member, means interconnecting said driving and driven members constructed and arranged to impart oscillatory movement of fixed amplitude to said driven member upon rotation of said driving member, an oscillatable driven element, means including a coupling interconnecting the oscillatable driven member and the oscillatable driven element constructed and arranged to increase the amplitude of oscillatory movement of the driven element with said fixed amplitude of oscillatory movement of the driven member, an electrical circuit arrangement for energizing said motor, and automatic switch means in said electrical circuit to deenergize said motor when the amplitude of oscillatory movement of said driven member is increased to a maximum.

9. Windshield wiper actuating mechanism including in combination, a rotatable driving member, a driven member, means interconnecting said driving and driven members constructed and arranged to impart oscillatory movement to said driven member upon rotation of said driving member, an oscillatable element, means including a coupling interconnecting the oscillatable driven member and the oscillatable driven element, said coupling including a drive dog attached to said driven member and a driven assembly rotatably attached to said driven element but capable of axial movement relative thereto, and means to effect axial movement of said driven assembly to vary the amplitude of oscillatory movement imparted to said driven element with a fixed amplitude of oscillatory movement of the driven member.

10. The combination set forth in claim 9 wherein the means for effecting axial movement of said driven coupling assembly comprises a solenoid actuated linkage.

11. Windshield wiper actuating mechanism including in combination, a rotatable driving member, an electric motor operatively connected to said driving member for effecting rotation thereof, a driven member, means interconnecting said driving and driven members constructed and arranged to impart oscillatory movement of fixed amplitude to said driven member upon rotation of said driving member, an oscillatable driven element, means including a coupling interconnecting the oscillatable driven member and the oscillatable driven element constructed and arranged to increase the amplitude of oscillatory movement imparted to said driven element with said fixed amplitude of oscillatory movement of the driven member, an electrical circuit for energizing said motor, and a manually operable switch in said electrical circuit for controlling the amplitude of oscillatory movement of said driven element and for deenergizing said motor when the amplitude of oscillatory movement of said driven element is increased to a maximum.

12. Windshield wiper actuating mechanism including in combination, a rotatable driving member, an electric motor operatively connected to said member for effecting rotation thereof, a driven member, means interconnecting said driving and driven members constructed and arranged to impart oscillatory movement of fixed amplitude to said driven member upon rotation of said driving member, an oscillatable driven element, means interconnecting the oscillatable driven member and the oscillatable driven element constructed and arranged to vary the amplitude of oscillatory movement imparted to the driven element with a fixed amplitude of oscillatory movement of the driven member, an electrical circuit for energizing said motor, and automatic switch means in said electrical circuit for deenergizing said motor upon a predetermined variation in the amplitude of oscillatory movement of said driven element.

13. Windshield wiper actuating mechanism including, an oscillatable driving member, means to impart oscillation of fixed amplitude to said driving member, an oscillatable driven member, a coupling drivingly interconnecting the oscillatable members, and means for adjusting said coupling to vary the amplitude of oscillation imparted to said driven member with said fixed amplitude of oscillatory movement of said driving member.

14. Windshield wiper actuating mechanism including in combination, an electric motor, an energizing circuit for said motor, an oscillatable driving member, means interconnecting the electric motor and said member for imparting oscillation of fixed magnitude thereto during operation of said motor, an oscillatable driven member, a coupling drivingly interconnecting the oscillatable members and means for adjusting said coupling so as to vary the amplitude of oscillation imparted to said driven member with said fixed amplitude of oscillation of said driving member and thereafter interrupt the driving connection between said members.

15. Windshield wiper actuating mechanism including in combination, an electric motor, an energizing circuit for said electric motor including a manually operable switch for controlling motor energization, an oscillatable driving member, means interconnecting the electric motor and said member for imparting oscillation of fixed amplitude thereto upon energization of said motor, an oscillatable driven member, a coupling drivingly interconnecting the oscillatable members, solenoid operated means for adjusting said coupling for varying the amplitude of oscillation imparted to said driven member with said fixed oscillatory movement of said driving member, and means including said manually operable switch for energizing said solenoid operated means.

16. Windshield wiper actuating mechanism including in combination, an electric motor, an electrical circuit for energizing said motor including a manually operable switch for controlling motor energization, an oscillatable driving member, means interconnecting the electric motor and said member for imparting oscillation of fixed amplitude thereto upon motor energization, an oscillatable driven member, a coupling drivingly interconnecting said members, solenoid operated means for adjusting said coupling to vary the amplitude of oscillation imparted to said driven member, and automatic switch means in said electric circuit for deenergizing said electric motor upon a predetermined variation in the amplitude of oscillation imparted to said driven member.

17. In combination with windshield wiper actuating mechanism, a coupling comprising, driving and driven members, said driving member having a radially extending projection, said driven member comprising a pair of cup-shaped elements having slotted, coengaging surfaces which form a pair of axially spaced, radially misaligned slots, means to impart oscillatory movement of fixed amplitude to said driving member, and means to effect axial movement of said driving member so that the projection thereof is received in one or the other of the slots in said driven member, the construction and arrangement being such that the amplitude of oscillatory movement of said driven member is variable dependent upon which of the slots in said driven member is engaged by the projection of said driving member.

References Cited in the file of this patent

UNITED STATES PATENTS

| | | |
|---|---|---|
| 231,828 | McCord | Aug. 31, 1880 |
| 1,737,082 | Gough | Nov. 26, 1929 |
| 2,060,175 | Carleton | Nov. 10, 1936 |
| 2,173,447 | Horton | Sept. 19, 1939 |
| 2,452,496 | Schneider et al. | Oct. 26, 1948 |
| 2,491,697 | Vischulis et al. | Dec. 20, 1949 |
| 2,541,790 | Sugden | Feb. 13, 1951 |